Dec. 17, 1929.  C. H. JOCKMUS  1,739,721
RADIATOR VALVE
Filed Feb. 1, 1927
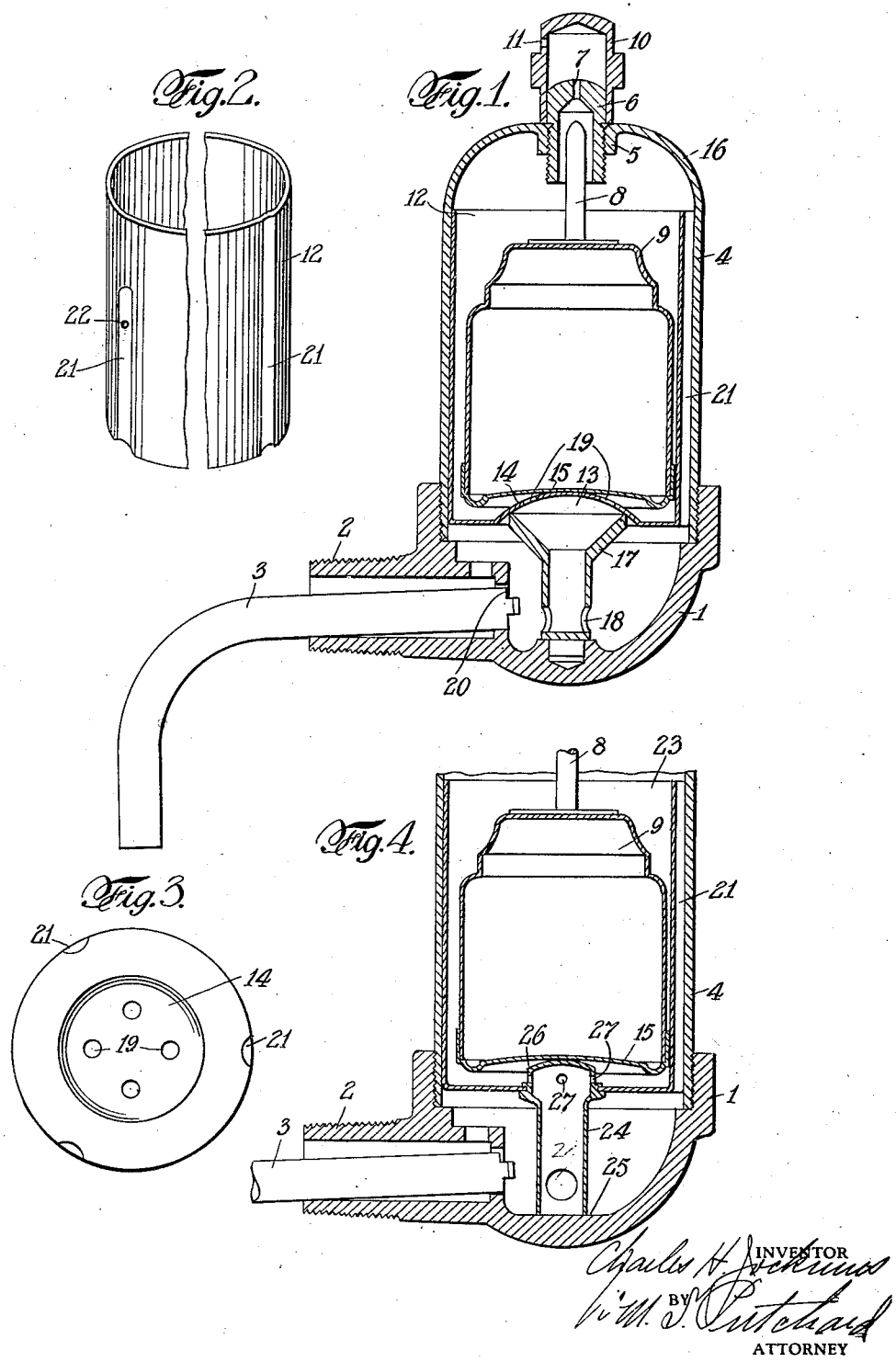

Patented Dec. 17, 1929

1,739,721

UNITED STATES PATENT OFFICE

CHARLES H. JOCKMUS, OF ANSONIA, CONNECTICUT

RADIATOR VALVE

Application filed February 1, 1927. Serial No. 165,118.

This invention relates to a valve and more particularly to that type of valve which is designed to control the escape of air from a steam radiator. A valve of this kind permits the passage of air from the radiator as it is forced into the valve by the incoming steam and the valve is provided with a vent opening through which the air may pass, this opening being closed by means of a valve stem which in turn may be actuated by an element known in the art as a float. This float is in the form of a hollow body containing a few drops of volatile liquid which will expand rapidly upon becoming heated. The force created by the expanding liquid is exerted upon a support upon which the float rests and thus the float is lifted to close the valve, in a manner known in the art and which will be more fully described later.

It has been found that the float is usually operated to close the valve before the radiator is full of steam, this action being caused by the fact that the air which the steam is forcing through the valve is sufficiently hot to cause expansion of liquid in the float. For example, when the air reaches a temperature of approximately 170° F., the float will operate to close the valve, thus leaving a substantial amount of air in the radiator in place of steam, with the resulting loss in efficiency.

It is the object of my invention to provide a valve employing a float of the above character which is adapted to operate below the temperature of steam, the valve embodying means delaying the operation of the float to close the valve until the float is subjected to a temperature substantially the same as that of steam, so that substantially all the air in the radiator may be forced out by the steam before the valve will close. This object I achieve by providing a shield for the float which will permit the passage of air without causing the float to close the valve.

The invention will be better understood by the following description when taken in connection with the accompanying drawing, in which:

Figure 1 is a vertical sectional view through one form of valve constructed according to my invention.

Figure 2 shows fragmentary perspective views of shields embodying different constructions.

Figure 3 is a bottom view of the shield shown in Figure 1.

Figure 4 is a view corresponding to Figure 1 showing a different embodiment which my invention may take.

Referring first to the embodiment shown in Figure 1, it will be seen that my invention comprises a valve having the base 1 provided with the usual connection 2 by means of which the valve is attached to a radiator, the steam and air passing through this connection in the usual way. Disposed in the connection 2 is a siphon tube 3 by means of which water may be siphoned from the valve. Supported on the base 1 and secured thereto as by a threaded connection is a shell 4 forming with the base 1 a valve chamber, and having at its top an opening surrounded by the inturned flange 5 in which is threaded the valve housing 6. This housing is provided with the vent opening 7 which is controlled by the valve stem 8 operated by the float 9. In this embodiment the stem is shown as being secured to the float but my invention is equally applicable to a valve in which the stem is disconnected from the float. The usual cap 10 having the vent 11 is also provided to protect the vent 7.

Surrounding the float 9 and preferably spaced therefrom is the shield 12. This shield is preferably in the form of a sheet metal cup fitting the interior wall of the shell and having in its bottom a depression 13 which forms a convex upper surface 14 upon which may rest the concave bottom 15 of the float. The float is sealed tightly and contains a volatile liquid which, upon expansion, will cause the concave bottom 15 to bow outwardly and thus lift the valve stem 8 to close the vent 7. The shield is limited in its upward movement by the curved top 16 of the shell 4. This concave top acts also as a centering means in case the shield is made of materially less diameter than the inner diameter of the shell.

The shield is supported by means of a post 17 secured in the base 1. This post is preferably hollow, as shown, and is provided with one or more openings 18 disposed adjacent the bottom thereof. The depressed portion 13 of the shield is provided with a plurality of openings 19 through which the water of condensation may escape into the hollow interior of the post. It will be noted that the openings 18 are disposed sufficiently low so that water in the interior of the post may be siphoned therefrom by the tube 3, when this tube is operating. Water is siphoned through this tube whenever it accumulates in the base sufficiently to cover the inner end 20 of the tube, and it will be seen that the arrangement shown forms a water trap to prevent air passing to the interior of the shield by way of the post 17. The air, therefore, is forced to take the intended path through the channels 21.

The shield will effectively prevent the hot air, which is propelled through the valve ahead of the steam, from effecting the operation of the float. It will be seen that the shield is provided with channels 21 in the wall thereof. These channels preferably extend to the top of the shield, as best shown in the right view of Figure 2, although they may stop below the top and be provided with apertures 22, as shown in the left view of Figure 2. In either case, air passing through the channels will pass upwardly and outwardly through the vent 7, without heating the float sufficiently to cause it to operate. However, the steam, when it enters the shield, will impart sufficient heat to the float to cause it to operate at once. The action of the heat on the float is delayed by the shield until the temperature of the space surrounding the float is substantially that of steam. The number of channels may vary but I have shown them herein as being three, as I have found that this arrangement gives very satisfactory results.

In Figure 4, I have shown a different embodiment of my invention. In this form the base 1, connection 2, siphon tube 3, shell 4, and float 9 are the same as in the other embodiment. The float operates the valve stem 8 to close the valve in the same manner as shown in Figure 1. In this form, however, the float is protected by means of a shield 23 having united therewith a post 24 upon which the shield is supported, this post contacting with a suitable seat 25 on the base. The post may conveniently be formed with the head 26 extending into the cup and secured thereto so that the head forms a part of the shield, having a convex top contacting with the concave bottom 15 of the float. The head is provided with apertures 27 through which the water of condensation may pass into the post and out through the apertures 28 adjacent the bottom thereof. This form operates in the same manner as the form shown in Figure 1, it being provided with channels 21, which function in the same manner as the channels 21 of the embodiment first described.

In operation, steam entering the radiator will force the air therein through the valve, this air entering the valve chamber formed by the base 1 and shell 4 and passing through the channels 21 to the vent 7. The shield is in the form of a cup providing an air space substantially surrounding the float and will conduct heat away from the float, while the channels act as guides for the float. It is therefore to be seen that the shield protects the float from the action of the heated air until such time as the steam enters the valve or until the temperature in the shield is substantially that of steam. The float will then be operated to close the vent 7. The water of condensation may pass out through the apertures 19 or 27, as the case may be, and will be siphoned off through the tube 3, as it collects in the base 1.

One of the difficulties experienced in valves of this nature is the violent actuation of the float by surging in the valve. This surging usually causes water to be emitted from the vent, which result is of course one to be avoided. My invention avoids this trouble by preventing the surging action from reaching the float. As plainly seen, the apertures 19 or 27 are relatively small, so that fluid cannot pass therethrough rapidly enough to keep up with the vibrations caused by the surging. Therefore, the float is permitted to operate in its intended manner without interference from any surging action.

From the above description it will be apparent that I have produced a device of the character enumerated as desirable, and, while I have illustrated and described the preferred form of the invention, it will be understood that I reserve the right to all changes properly falling within the spirit and scope of the appended claims.

I claim:

1. A valve comprising a chamber having an air vent and an entrance for steam, a float disposed in said chamber and adapted to cause closing of said vent when said float is subjected to heat, a post, and a shield disposed upon said post and supporting said float.

2. A valve comprising a chamber having an air vent and an entrance for steam, a float disposed in said chamber and adapted to cause closing of said vent when said float is subjected to heat, a post, and a shield disposed upon said post and supporting said float, said float having a concave bottom and said shield having a portion curved in the same direction as the bottom of the float whereby the shield and the float will contact with each other substantially at a point.

3. A valve comprising a chamber having an air vent and an entrance for steam, a float disposed in said chamber and adapted to cause closing of said vent when said float is subjected to heat, and a shield for said float in the form of a cup surrounding said float, said cup having channels extending upwardly along the wall of the chamber and communicating with the interior of the cup, for the purpose set forth.

4. A valve comprising a chamber having an air vent and an entrance for steam, a float disposed in said chamber and adapted to cause closing of said vent when said float is subjected to heat, and a shield for said float in the form of a cup surrounding said float, said cup having channels extending upwardly along the wall of the chamber and communicating with the interior of the cup and means for draining water from said cup.

5. A valve comprising a chamber having an air vent and an entrance for steam, a float disposed in said chamber and adapted to cause closing of said vent when said float is subjected to heat, and a shield for said float in the form of a cup surrounding said float, said cup having channels extending upwardly along the wall of the chamber and communicating with the interior of the cup, said channels also acting as guides to prevent vibration of said float.

6. A valve comprising a chamber having an air vent and an entrance for steam, a float disposed in said chamber and adapted to cause closing of said vent when said float is subjected to heat, a cup-shaped shield disposed between said float and said steam entrance, and means to drain water from said shield into the bottom of said chamber.

7. A valve comprising a chamber having an air vent and an entrance for steam, a float disposed in said chamber and adapted to cause closing of said vent when said float is subjected to heat, a hollow post disposed in the bottom of said chamber, a shield disposed upon said post and supporting said float, and means permitting water to drain from said shield through said hollow post into the bottom of the chamber.

8. A valve comprising a chamber having an air vent and an entrance for steam, a float disposed in said chamber and adapted to cause closing of said vent when said float is subjected to heat, a hollow post disposed in the bottom of said chamber and having an aperture adjacent the bottom thereof, a shield supported on said post and supporting said float, and means permitting water to drain from the shield through said post whereby the water will accumulate in said chamber.

9. A valve comprising a chamber having an air vent and an entrance for steam, a float disposed in said chamber and adapted to cause closing of said vent when said float is subjected to heat, a hollow post disposed in the bottom of said chamber and having an aperture adjacent the bottom thereof, a shield supported on said post and supporting said float, means permitting water to drain from the shield through said post, and a siphon tube adapted to remove the water from said chamber.

10. A valve comprising a chamber having an air vent and an entrance for steam, a hollow post disposed in the bottom of the chamber, a cup-like shield in said chamber and supported on said post above said entrance, a portion of the bottom wall of the shield over said post being concave, providing a convex portion within the shield, a float disposed within said shield and normally supported on said convex portion of the shield, and means on said float to close said vent when said float is subjected to heat.

11. A valve comprising a chamber having an air vent and an entrance for steam, a hollow post disposed in the bottom of the chamber, a cup-like shield in said chamber and supported on said post above said entrance, a portion of the bottom wall of the shield over said post being concave, providing a convex portion within the shield, a float disposed within said shield and normally supported on said convex portion of the shield, means on said float to close said vent when said float is subjected to heat, and drain openings in the bottom of said shield discharging into said post, and said post communicating with said chamber near the bottom thereof.

In testimony whereof, I have affixed my signature.

CHARLES H. JOCKMUS.